United States Patent [19]
Perlman et al.

[11] Patent Number: 5,309,437
[45] Date of Patent: May 3, 1994

[54] BRIDGE-LIKE INTERNET PROTOCOL ROUTER

[75] Inventors: Radia J. Perlman, Acton, Mass.; G. Paul Koning, Brookline, N.H.

[73] Assignee: Digital Equipment Corporation, Maynard, Mass.

[21] Appl. No.: 546,619

[22] Filed: Jun. 29, 1990

[51] Int. Cl.$^5$ .............................................. H04J 3/02
[52] U.S. Cl. ................. 370/85.13; 370/94.1; 340/825.02
[58] Field of Search ............ 340/827, 825.02, 825.02, 340/825.5; 370/85.13, 44.1, 60, 85.9, 85.14, 85.15, 16, 85.4, 85.1, 85.6, 94.3

[56] References Cited

U.S. PATENT DOCUMENTS

| | | | |
|---|---|---|---|
| 4,597,078 | 6/1986 | Kempf | 370/85.13 |
| 4,627,052 | 12/1986 | Hoare et al. | 370/85.13 |
| 4,638,475 | 1/1987 | Koike | 370/60 |
| 4,706,080 | 11/1987 | Sincoskie | 340/825.02 |
| 4,706,081 | 11/1987 | Hart et al. | 370/85.13 |
| 4,707,827 | 11/1987 | Bione et al. | 370/85.13 |
| 4,737,953 | 4/1988 | Koch et al. | 370/85.13 |
| 4,780,873 | 10/1988 | Mattheyses | 370/60 |
| 4,797,881 | 1/1989 | Ben-Artzi | 370/85.4 |
| 4,811,337 | 3/1989 | Hart | 370/85.13 |
| 4,831,620 | 5/1989 | Conway et al. | 370/85.13 |
| 4,933,937 | 6/1990 | Konishi | 370/85.3 |
| 5,018,137 | 5/1991 | Backes et al. | 370/85.13 |
| 5,058,109 | 10/1991 | Goldberg et al. | 370/94.1 |
| 5,060,228 | 10/1991 | Tsutsui et al. | 370/85.13 |

OTHER PUBLICATIONS

IEEE Project 802 draft on Local and Metropolitan Area Networks, MAC Bridges, P802.1d/Dg, Jul. 14, 1989.

*Primary Examiner*—Douglas W. Olms
*Assistant Examiner*—Dang Ton
*Attorney, Agent, or Firm*—A. Sidney Johnston; Albert P. Cefalo; Noel F. Heal

[57] ABSTRACT

A device and related method for coupling segments of an extended local area network (LAN) in such a way that message traffic employing inter-network protocols such as TCP/IP will be handled without the difficulties usually associated with bridges, and without the complexity and expense of full IP router capability. The device operates like a bridge for non-TCP/IP traffic. For TCP/IP traffic it operates in a bridge-like manner but maintains a database associating extended LAN segment addresses with port numbers in the device, so that packets can be automatically forwarded over a spanning tree connecting the network segments. A host computer in any network segment can address others in different network segments of the extended LAN as though all were in a single LAN. The device of the invention functions to block the flow of ARP messages and to generate ARP replies that render the device of the invention transparent to hosts within the extended LAN. The device is also transparent to true IP routers, which may still be used to effect communication with points outside the extended LAN.

26 Claims, 4 Drawing Sheets

BRIDGE-LIKE INTERNET PROTOCOL ROUTER

BACKGROUND OF THE INVENTION

This invention relates generally to local area networks (LANs) of computers and, more particularly, to multiple LANs that are interconnected by bridges and routers. More specifically, the invention is concerned with a problem that arises in interconnected networks using a set of protocols generally known as TCP/IP. TCP stands for Transmission Control Protocol, and IP is Internet Protocol. The following background material introduces various computer network concepts and definitions. Those familiar with computer networks and TCP/IP may wish to skip to the subsection headed "The Problem."

Computer Network Background

A computer network is simply a collection of autonomous computers connected together to permit sharing of hardware and software resources, and to increase overall reliability. The qualifying term "local area" is usually applied to computer networks in which the computers are located in a single building or in nearby buildings, such as on a college campus or at a single corporate site. When the computers are further apart, the terms "wide area network" or "long haul network" are used, but the distinction is one of degree and the definitions sometimes overlap.

A bridge is a device that is connected to at least two LANs and serves to pass message frames or packets between LANs, such that a source station on one LAN can transmit data to a destination station on another LAN, without concern for the location of the destination. Bridges are useful and necessary network components, principally because the total number of stations on a single LAN is limited. Bridges can be implemented to operate at a selected layer of protocol of the network. A detailed knowledge of network architecture is not needed for an understanding of this invention, but a brief description follows by way of further background.

As computer networks have developed, various approaches have been used in the choice of communication medium, network topology, message format, protocols for channel access, and so forth. Some of these approaches have emerged as de facto standards, but there is still no single standard for network communication. However, a model for network architectures has been proposed and widely accepted. It is known as the International Standards Organization (ISO) Open Systems Interconnection (OSI) reference model. The OSI reference model is not itself a network architecture. Rather it specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium and back up the successive layers of the other computer. However, for purposes of design of the various layers and understanding their functions, it is easier to consider each of the layers as communicating with its counterpart at the same level, in a "horizontal" direction.

The lowest layer defined by the OSI model is called the physical layer, and is concerned with transmitting raw data bits over the communication channel. Design of the physical layer involves issues of electrical, mechanical or optical engineering, depending on the medium used for the communication channel. The layer next to the physical layer is called the data link layer. The main task of the data link layer is to transform the physical layer, which interfaces directly with the channel medium, into a communication link that appears error-free to the next layer above, known as the network layer. The data link layer performs such functions as structuring data into packets or frames, and attaching control information to the packets or frames, such as checksums for error detection, and packet numbers.

Although the data link layer is primarily independent of the nature of the physical transmission medium, certain aspects of the data link layer function are more dependent on the transmission medium. For this reason, the data link layer in some network architectures is divided into two sublayers: a logical link control sublayer, which performs all medium-independent functions of the data link layer, and a media access control (MAC) sublayer. This sublayer determines which station should get access to the communication channel when there are conflicting requests for access. The functions of the MAC layer are more likely to be dependent on the nature of the transmission medium.

Bridges may be designed to operate in the MAC sublayer. Further details may be found in "MAC Bridges," P802.1D/D6, September 1988, a draft publication of IEEE Project 802 on Local and Metropolitan Area Network Standards, or in later drafts of this document.

The basic function of a bridge is to listen "promiscuously," i.e. to all message traffic on all LANs to which it is connected, and to forward each message it hears onto LANs other than the one from which the message was heard. Bridges also maintain a database of station locations, derived from the content of the messages being forwarded. Bridges are connected to LANs by paths known as "links." After a bridge has been in operation for some time, it can associate practically every station with a particular link connecting the bridge to a LAN, and can then forward messages in a more efficient manner, transmitting only over the appropriate link. The bridge can also recognize a message that does not need to be forwarded, because the source and destination stations are both reached through the same link. Except for its function of "learning" station locations, or at least station directions, the bridge operates basically as a message repeater.

As network topologies become more complex, with large numbers of LANs, and multiple bridges interconnecting them, operational difficulties can ensue if all possible LAN bridging connections are permitted. In particular, if several LANs are connected by bridges to form a closed loop, a message may be circulated back to the LAN from which it was originally transmitted, and multiple copies of the same message will be generated. In the worst case, messages will be duplicated to such a degree that the networks will be effectively clogged with these messages and unable to operate at all.

To prevent the formation of closed loops in bridged networks, IEEE draft publication P802.1D, referred to above, proposes a standard for a spanning tree algorithm that will connect the bridged network into a tree configuration, containing no closed loops, and spanning the entire network configuration. The spanning tree algorithm is executed periodically by the bridges on the interconnected network, to ensure that the tree structure is maintained, even if the physical configuration of the network changes. Basically, the bridges execute the spanning tree algorithm by sending special messages to each other to establish the identity of a "root" bridge. The root bridge is selected, for convenience, as the one with the smallest numerical identification. The algorithm determines which links of the bridges are to be active and which are to be inactive, i.e. disabled, in configuring the tree structure. One more piece of terminology is needed to understand how the algorithm operates. Each LAN has a "designated" link, which means that one of the links connectable to the LAN is designated to carry traffic toward and away from the root bridge. The basis for this decision is similar to the basis for selecting the root bridge. The designated link is the one providing the least costly (shortest) path to the root bridge, with numerical bridge identification being used as a tie-breaker. Once the designated links are identified, the algorithm chooses two types of links to be activated or closed: first, for each LAN its designated link is chosen, and second, for each bridge a link that forms the "best path" to the root bridge is chosen, i.e. a link through which the bridge received a message giving the identity of the root bridge. All other links are inactivated. Execution of the algorithm results in interconnection of the LANs and bridges in a tree structure, i.e. one having no closed loops.

Internet is a collection of networks, including Arpanet, NSFnet, regional networks such as NYsernet, local networks at a number of university and research institutions, and a number of military networks. The protocols generally referred to as TCP/IP were originally developed for use only through Arpanet and have subsequently become widely used in the industry. The protocols provide a set of services that permit users to communicate with each other across the entire Internet. The specific services that these protocols provide are not important to the present invention, but include file transfer, remote log-in, remote execution, remote printing, computer mail, and access to network file systems.

The basic function of the Transmission Control Protocol (TCP) is to make sure that commands and messages from an application protocol, such as computer mail, are sent to their desired destinations. TCP keeps track of what is sent, and retransmits anything that does not get to its destination correctly. If any message is too long to be sent as one "datagram," TCP will split it into multiple datagrams and makes sure that they all arrive correctly and are reassembled for the application program at the receiving end. Since these functions are needed for many applications, they are collected into a separate protocol (TCP) rather than being part of each application. TCP is implemented in the transport layer of the OSI reference model.

The Internet Protocol (IP) is implemented in the network layer of the OSI reference model, and provides a basic service to TCP: delivering datagrams to their destinations. TCP simply hands IP a datagram with an intended destination; IP is unaware of any relationship between successive datagrams, and merely handles routing of each datagram to its destination. If the destination is a station connected to a different LAN, the IP makes use of routers to forward the message.

A router, like a bridge, is a device connected to two or more LANs. Unlike a bridge, however, a router operates at the network layer level, instead of the data link layer level. Addressing at the network layer level makes use of a 32-bit address field for each host, and the address field includes a unique network identifier and a host identifier within the network. Routers make use of the destination network identifier in a message to determine an optimum path from the source network to the destination network. Various routing algorithms may be used by routers to determine the optimum paths. Typically, routers exchange information about the identities of the networks to which they are connected.

When a message reaches its destination network, a data link layer address is needed to complete forwarding to the destination host. Data link layer addresses are 48 bits long and are globally unique, i.e. no two hosts, wherever located, have the same data link layer address. There is a protocol called ARP (address resolution protocol), which obtains a data link layer address from the corresponding network layer address (the address that IP uses). Typically, each router maintains a database table from which it can look up the data link layer address, but if a destination host is not in this ARP database, the router can transmit an ARP request. This message basically means: "will the host with the following network layer address please supply its data link layer address." Only the addressed destination host responds, and the router is then able to insert the correct data link layer address into the message being forwarded, and to transmit the message to its final destination.

The Problem

As discussed above, bridges operate at the data link layer level and are effectively "transparent" to user stations or "hosts" connected to the LANs. That is to say, a message directed to a destination on a different LAN from the one to which the source of the message is connected, will reach the destination through a bridge without the source's knowing that tee destination is on a different LAN. Bridges work well for message traffic that is not using the TCP/IP protocols. However, for TCP/IP traffic a significant problem is sometimes caused by ARP messages, especially when bridges are used within an extended network of LANs. For some network implementations, ARP packets can be duplicated by bridges and this can result in "flurries" or even "storms" of ARP packets, which disrupt normal traffic flow. Ideally, ARP packets should be confined to the LAN in which they originate, but bridges are designed to be transparent to all traffic. One possible solution is to use a combination of a bridge and a router in every situation in which a bridge might be used, but providing full router functionality is more complex and more expensive than using conventional bridges.

The need for an alternative to bridges and routers is particularly critical in an "extended network" administered by a single institution. For example, a corporation or a university may have the need to configure a number of "subnets" or "network segments" that are interconnected into one extended network. From outside the extended network, there appears to be just a single network, i.e. there is one network identifier in the network layer address, and messages destined for a host computer within the extended network are addressed as if this were the case. Within the extended network, however, part of the host identifier field of the network layer address is used as a subnet address or network segment address. The network segments might be connected by bridges, but these would be subject to the ARP storm problem outlined above. Another problem with using bridges for TCP/IP traffic is that some IP data packets may be too large for a bridge to forward, and will then be discarded by the bridge.

It will be apparent from the foregoing that there is a need for an alternative to conventional bridges in interconnected networks handling TCP/IP traffic. Ideally, what is needed is a network interconnection device that can handle TCP/IP traffic without the added complexity of a router, and without the problems inherent in the use of bridges. The present invention satisfies this need, as will become apparent from the following summary.

SUMMARY OF THE INVENTION

The present invention resides in a bridge-like IP router (BLIP) that functions exactly like a bridge for non-TCP/IP traffic, and functions in a bridge-like manner for TCP/IP traffic, forwarding messages through a spanning tree and learning source and destination addresses, at a network layer level, by correlating the direction from which messages arrive with the source subnet addresses they contain. Thus the bridge-like IP router functions very much like a bridge, but at the network layer level of addressing.

Although the invention addresses a problem that arises in the specific context of the TCP/IP protocols, in a more general sense the invention applies to any inter-network protocols that operate at the network layer level, using an addressing scheme of network addresses and host addresses within each network. Basically, the invention is embodied in a bridge-like device that functions at this network layer level, as well as at a lower level at which globally unique host addresses are used.

As it relates more specifically to the TCP/IP protocols, the device of the invention comprises multiple ports for attaching the BLIP to multiple segments of an extended LAN, means for distinguishing received TCP/IP message traffic from non-TCP/IP message traffic, bridge means for processing non-TCP/IP message traffic exactly in the manner of a conventional bridge, and bridge-like means for processing TCP/IP traffic in a manner analogous to a bridge. A message packet received from an extended LAN segment attached to the BLIP is forwarded, if necessary, to at least one other extended LAN segment attached to the BLIP. Forwarding to another segment will not be necessary if the destination address is known to be reachable via the bridge port through which the message was received.

Further, the device of the invention includes means for processing address resolution (ARP) messages, including means for detecting and discarding ARP messages requesting destination address information, and means for responding to ARP messages with a special address code when the requested destination address is on a different segment of the same extended LAN as the BLIP. The bridge-like means includes means for possibly forwarding a message packet having the special address code to some subset of the attached extended LAN segments except the one from which the message packet was received. A host device may, therefore, transmit to destinations on other extended LAN segments as though the destinations were on the same LAN. The source host first requests the data link level address of the destination by sending an ARP message. A BLIP intercepts the ARP message and sends a special reply address. When the source host uses this special address in sending a data packet, the packet is received by the BLIP and forwarded, along a spanning tree previously computed collectively by all of the bridges, to one or more other attached extended LAN segments. When a BLIP receives a packet destined for an attached segment, the BLIP obtains the correct data link layer address by searching its ARP database and sending an ARP message if necessary.

The BLIP also includes an IP database associating each segment of the extended LAN with a port of the BLIP, and means for updating the IP database by observing each received message and correlating the segment address for each message source with a port through which the message is received. There is also an ARP database associating each network layer address in attached extended LAN segments with a corresponding data link layer address, and means for updating the ARP database by sending ARP messages directed to specific network layer addresses and processing ARP replies that contain the corresponding data link layer addresses.

Further, each BLIP has a router database containing the data link layer addresses of all true IP routers connected to the extended LAN. The router database is used to facilitate communication with host devices outside the extended LAN.

More specifically, the bridge-like means of the BLIP includes means for determining whether a received message packet is destined for an attached segment of the extended LAN, means for forwarding a packet destined for an attached segment other than the one from which the packet was transmitted, by obtaining a data link layer destination address from the ARP database, and means for forwarding a packet destined for a segment unattached to the BLIP, by transmitting the packet to at least one other segment through a port selected to reach the destination segment.

Another feature of the invention device is address checking means effective for processing a packet destined for the same extended LAN segment as the one from which the packet was transmitted. The address checking means takes various corrective actions, depending on the data link layer destination address contained in the packet. The corrective action may simply be to discard the packet, if the data link layer destination address matches an entry in the ARP database corresponding to an IP destination address contained in the packet. Alternatively, if there is no match between these addresses, the corrective action may be to substitute the ARP database entry for the data link layer destination address in the packet, and to send a redirect message to a source host from which the packet was transmitted.

In terms of a novel method, the invention comprises the steps of configuring an extended local area network (LAN) to include a plurality of extended LAN segments connected by bridge-like IP routers (BLIPs), receiving a packet of data at a BLIP, determining whether the packet has been transmitted under TCP/IP protocols, processing non-TCP/IP packets in the manner of a conventional bridge, and processing TCP/IP traffic in a manner analogous to a bridge.

Additional steps of the method include detecting and discarding ARP messages requesting destination address information, responding to ARP messages with a special address code when the requested destination address is on a different segment of the same extended LAN as the BLIP, and forwarding a message packet having the special address code to some subset of the attached extended LAN segments except the one from which the message packet was received. These functions of the BLIP allow a host device to transmit to destinations on other extended LAN segments as though the destinations were on the same LAN.

Other steps of the method include maintaining an IP database that associates each segment of the extended LAN with a port of the BLIP, maintaining an ARP database that associates each network layer address in attached extended LAN segments with a corresponding data link layer address, and maintaining a router database containing the data link layer addresses of all true IP routers connected to the extended LAN.

More specifically, the method may include the steps of determining whether a received message packet is destined for an attached segment of the extended LAN, forwarding a packet destined for an attached segment other than the one from which the packet was transmitted, by obtaining a data link layer destination address from the ARP database, and forwarding a packet destined for a segment unattached to the BLIP, by transmitting the packet to some subset of the attached extended LAN segments except the one from which the message packet was received.

It will be appreciated from this summary that the invention represents a significant advance in the field of interconnected local area networks using the TCP/IP protocols. In particular, the invention facilitates communication between multiple LAN segments in an extended LAN, by means of bridge-like IP routers (BLIPs). The BLIPs of the invention are not much more complex than conventional bridges, but function to block propagation of ARP messages and permit communication between network segments as though all hosts in the extended LAN were in a single LAN. Other aspects and advantages of the invention will become apparent from the following more detailed description, taken in conjunction with the accompanying drawings.

DESCRIPTION OF THE PREFERRED EMBODIMENT

As shown in the drawings by way of illustration, the present invention is concerned with interconnected local area computer networks (LANs) that are used to handle message traffic in accordance with a set of protocols known as TCP/IP. As described in the foregoing background section of this specification, conventional bridges cannot handle TCP/IP traffic efficiently, principally because bridges may contribute to the generation of multiple ARP messages that propagate through the interconnected networks. The use of conventional routers overcomes this problem, but not without considerable complexity and expense.

In accordance with the invention, local area networks within an extended network are interconnected by a new device referred to as a BLIP, for bridge-like IP router. As will be described in detail, each BLIP functions exactly like a bridge for non-TCP/IP traffic, and functions in a manner analogous to a bridge for TCP/IP traffic, but using IP addresses, i.e. network layer addresses.

Figure 1:
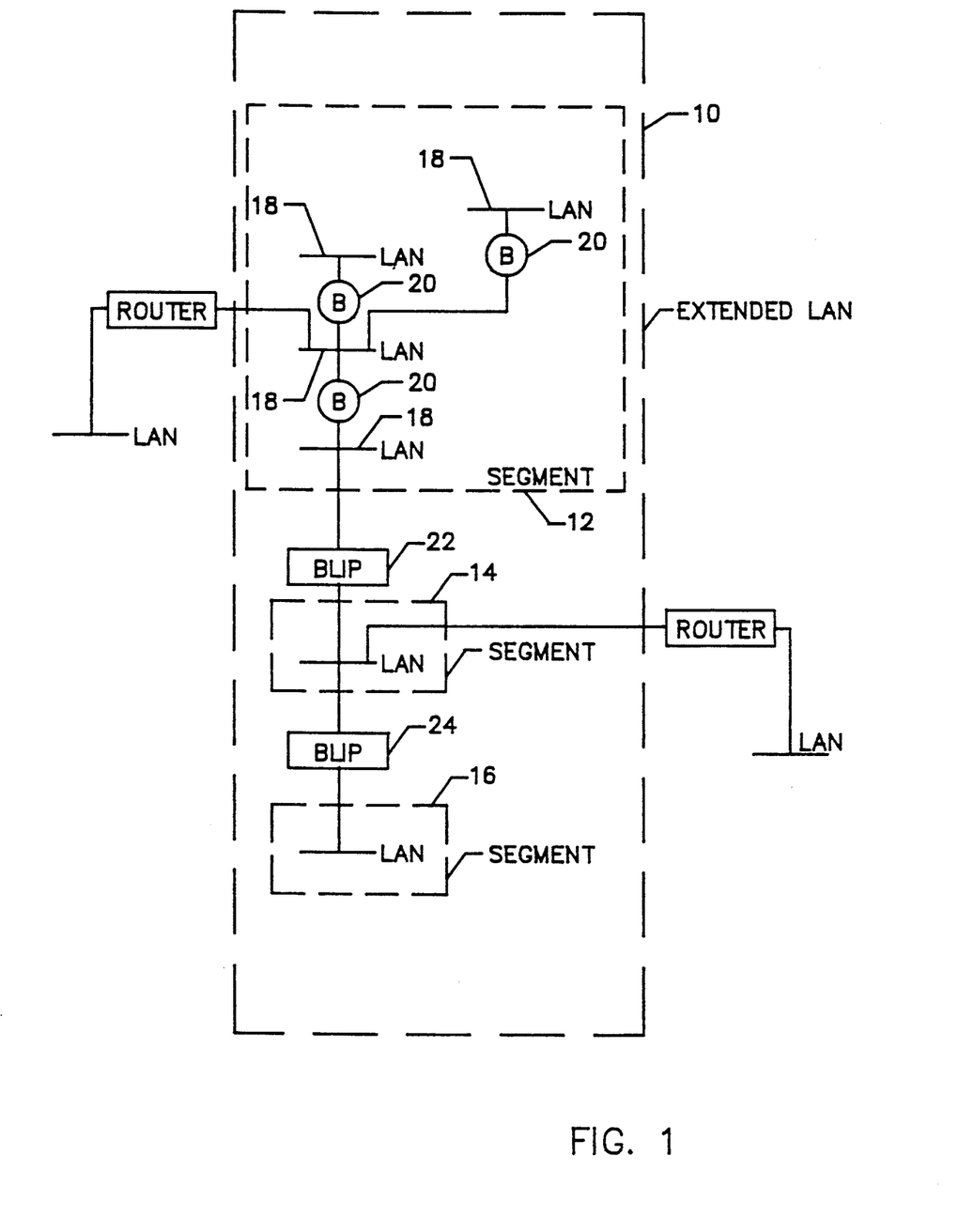
FIG. 1 is a simplified diagrammatic view showing an extended local area network (LAN) connected by IP routers to other networks.

FIG. 1 depicts in simplified form an extended LAN, indicated by reference numeral 10. Within the extended LAN 10 are shown three extended LAN segments 12, 14, 16. By way of example, extended LAN segment 12 includes four LANs 18, which are interconnected by bridges 20. The other extended LAN segments 14, 16 are single LANs. The extended LAN segments 12, 14, 16 are interconnected by bridge-like IP routers (BLIPs), indicated at 22 and 24. By way of further illustration, the extended LAN 10 is shown as being connected by IP routers 26, 28 to other networks 30, 32, respectively, which may also be extended LANs.

As viewed by routers, such as 26, 28, and by all host computers (not shown) connected to the various LANs in the configuration of FIG. 1, the extended LAN 10 has a single network address, e.g. network #5. Within the extended LAN 10, the extended LAN segments 12, 14, 16 have subnet addresses, or extended LAN segment addresses, appended to the extended LAN address. For example, the extended LAN segments might have subnet addresses 5.1, 5.2 and 5.3. The subnet portions of these addresses (.1, .2, .3) are used by the BLIPs in one mode of their operation in a bridge-like manner, and are known to the BLIPs initially from a manual configuration procedure.

One of the functions of the BLIPs is to run a spanning tree algorithm within the extended LAN 10, to ensure that the extended LAN segments are connected in a tree structure, having no continuous loops. The techniques for doing this are well known in the computer network field and will not be further discussed here. See, for example, the IEEE publication P802.1D referred to in the foregoing background section of this specification. In the simple example given in FIG. 1, there are only three extended LAN segments, connected in a serial string, so there is no possibility of a circular path. It will be understood, however, that the extended LAN segments could be interconnected in a more complex manner that would require the running of the spanning tree algorithm to reduce the configuration to a tree structure.

Figure 2A:
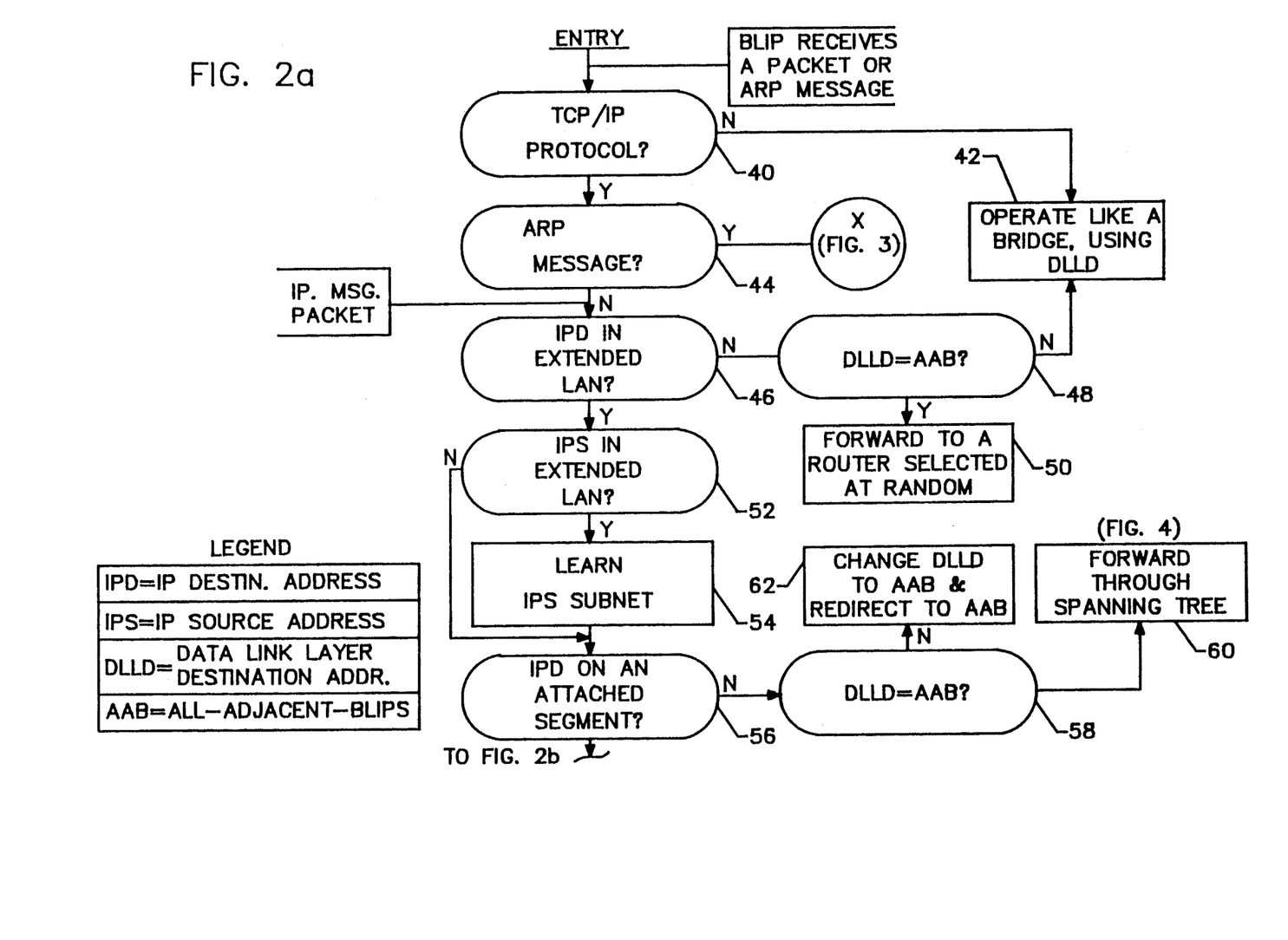
FIGS. 2(a)-2(b) are a flowchart showing the functions performed by a bridge-like IP router (BLIP) in accordance with the invention, upon receipt of a packet or ARP message.
Figure 2B:
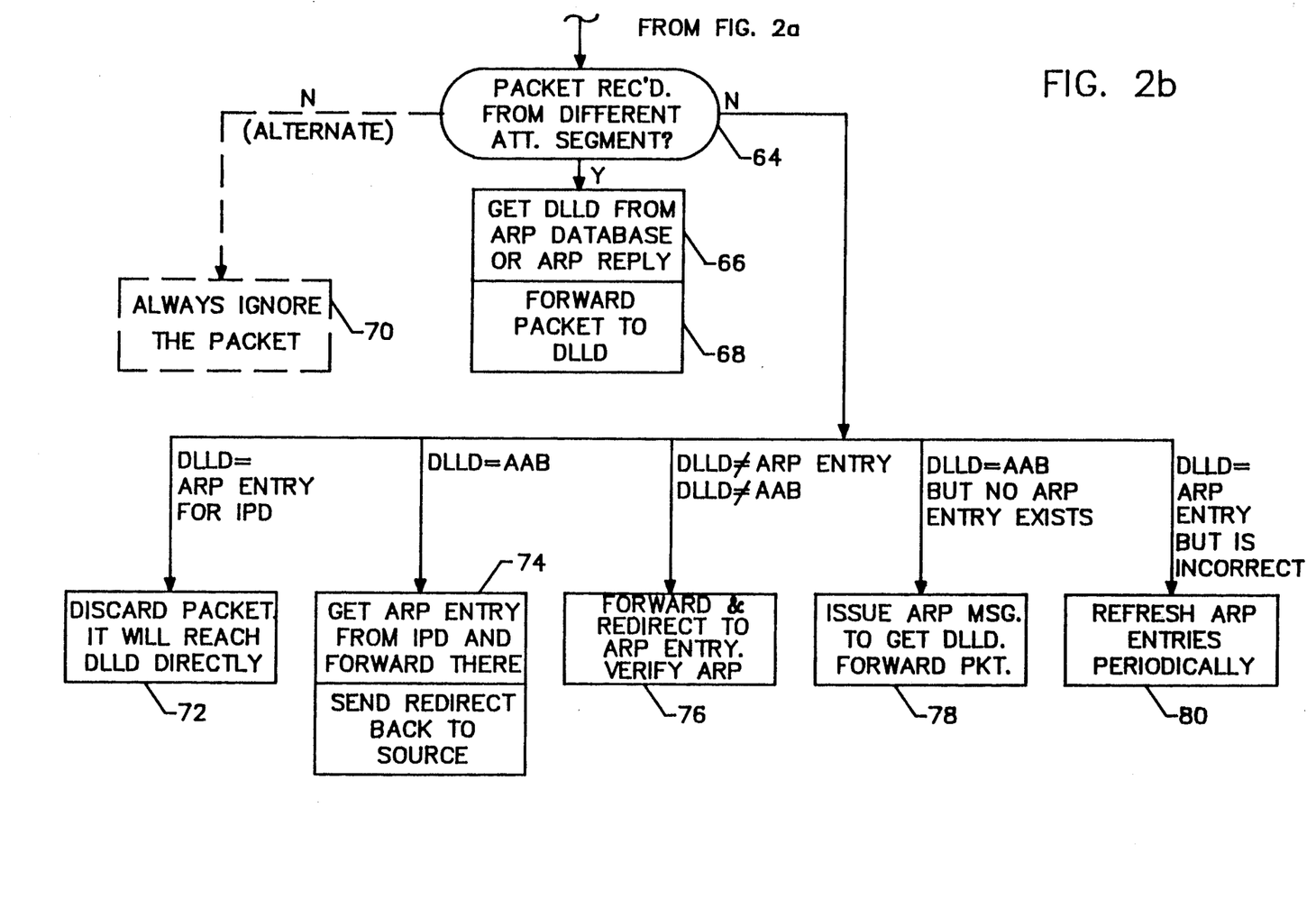

How the BLIPs 22, 24 function when they receive a data packet or an ARP message is best understood from the flowchart of FIGS. 2(a)-2(b). There are three databases maintained in each BLIP and referred to in the flowchart. These are the bridge database, the IP database and the ARP database. In addition there is a router database, which may be manually supplied to the BLIPs.

The bridge database is identical with one maintained in a conventional bridge. It consists of data link layer addresses associated with corresponding port numbers through which the BLIP communicates. Therefore, when the BLIP receives a message through one of its ports, i.e. from a particular direction in the extended LAN, it can associate the source data link layer address with the port through which the message was received.

The IP database is analogous to the bridge database except that it functions at the network layer or IP address level. When a message is received through a particular port, the extended LAN segment or subnet address of the message source is associated with that port. Thus, the BLIP "learns" the directions of the various subnets in the extended LAN.

The ARP database associates host identifying numbers, in the IP address, with data link layer addresses. The database is used for forwarding an IP packet to its final destination on an attached extended LAN segment. The database is acquired by listening to ARP replies, generated as a result of ARP messages sent by this and other BLIPs, or by other host devices in attached extended LAN segments.

As indicated in block 40 of FIG. 2(*a*), when a packet or ARP message is received by a BLIP, it first determines whether the received packet or message uses ARP and IP protocols within the TCP/IP protocol. This can be determined from a protocol field in the packet header. If the TCP/IP protocol is not employed, the BLIP continues processing the received packet in exactly the manner of a conventional bridge, as indicated in block 42. If the received message or packet does employ the TCP/IP protocol, it is next determined, in block 44, whether an ARP message has been received. If so, processing continues, as will be described with reference to FIG. 3. If not, then it is concluded that an IP message packet has been received. The next inquiry is to determine, in block 44, whether the IP destination address (IPD in the figure) is within the extended LAN in which the BLIP resides. If not, the destination address is in some other LAN or extended LAN, and the BLIP next examines the data link layer destination address (DLLD in the figure). If the DLLD is not a special address referred to as all-adjacent-BLIPs, as determined in block 48, the BLIP continues processing in the manner of a bridge, as indicated in block 42, using data link layer destination address. The significance of the all-adjacent-BLIPs address will become clear as this description proceeds. If this special address is found in the test of block 48, the BLIP picks a router at random and forwards the message to it, as indicated in block 50. Inherently, then, the BLIPs have to have knowledge of the directional locations of the IP routers.

If the test in block 46 determines that the IP destination is in the extended LAN 10, the next test, in block 52, asks whether the IP source address (IPS in the figure) is also in the extended LAN. If so, the BLIP "learns" the IP source address, as indicated in block 54. This is the same type of learning as a conventional bridge, except that the IP address is learned and not the data link address. Whenever an IP source address is seen by the BLIP, it updates its IP database, so that a subsequent message destined for the extended LAN segment can be transmitted in the correct direction. If the IP source is not in the extended LAN, the learning step is bypassed.

The next processing step is to determine whether the IP destination is on an attached segment of the extended LAN, as indicated in block 56. An attached segment is one to which this particular BLIP is directly connected. Thus, for example, BLIP 22 is attached to segments 12 and 14, but not to segment 16. If the IP destination is not in an attached segment, the data link layer destination address (DLLD) is examined, in block 58. If the DLLD is all-adjacent-BLIPs, the packet is forwarded through the spanning tree established by the BLIPs, as indicated at block 60, which is expanded in FIG. 4. If the all-adjacent-BLIPs address is not in the DLLD field of the packet, it should have been placed there by the source of the packet. The BLIP, as indicated in block 62, changes the DLLD field to all-adjacent-BLIPs and sends a "redirect" message back to the source, instructing that the all-adjacent-BLIPs address is to be used.

The all-adjacent-BLIPs address is basically a special code inserted in the data link layer destination address field to direct the packet to BLIPs attached to the segment from which the packet is sent. A host computer sending the packet uses the special code when the intended destination is located on a different segment of the extended LAN. A typical sequence of events is that the source host knows the IP address of its intended destination, but is unaware that the destination is located on a different subnet or extended LAN segment. This is because all hosts and routers are unaware of the subnet level of addressing, and all of the subnets in the extended LAN are perceived to be in the same network. The source host issues an ARP message to determine the data link level address of its intended destination. Because the destination is not in the same subnet, the destination host does not receive the ARP message, but at least one BLIP does. In processing the ARP message, the BLIP generates an ARP reply if the requested destination is on the extended LAN and on a different extended LAN segment from the source. The ARP reply gives the requested data link layer address as all-adjacent-BLIPs. Then the source host sends its data packet to what it believes to be a true data link layer address. In fact, the packet is received by a BLIP, and is forwarded through the spanning tree to an adjacent extended network segment, as indicated in block 60.

If the IP destination address is on an attached segment of this BLIP, it is next determined, in block 64, whether the packet was received from a different attached segment of the extended LAN. If so, the data link layer destination address is retrieved from the ARP database, or an ARP message is transmitted if the address is not yet in the ARP database, all of which is indicated in block 66. Once the data link layer destination address is obtained, the packet is forwarded to its final destination, as indicated at 68.

If it is determined, in block 64, that the packet was received from the same attached segment as the one to which the destination host is connected, this would normally indicate that a source host was sending a packet to a destination host on the same extended network segment. The BLIP need do nothing, since the packet will be recognized and received by the intended destination host. One processing option for the BLIP is simply to ignore the received packet in all cases, as indicated in block 70. However, a more rigorous approach is to examine the data link layer destination address (DLLD) to determine an appropriate course of action.

If the DLLD address in the packet corresponds with the ARP database entry for the IP destination address in the packet, the proper course is to discard the packet, as indicated in block 72, since it will reach its destination directly, without help of the BLIP. Another possibility is that the DLLD address is all-adjacent-BLIPs. This indicates an error on the part of the source host. A destination on the same extended LAN segment should be addressed to a real DLLD address and not to the special all-adjacent-BLIPs address. An appropriate action by the BLIP in this case is to obtain the ARP entry for the IP destination address, and to forward the packet there, as indicated in block 74, and to send a "redirect" message back to the source host to correct the problem.

A third possibility is that the DLLD address is not equal to the ARP database entry corresponding to the IP destination, and is not the special all-adjacent-BLIPs address either. This situation could occur because either the BLIPs ARP database or the DLLD in the packet is incorrect. One possible corrective action, as indicated in block 76, is to use the ARP database DLLD address and to send a "redirect" message to the source host. Also the ARP database entry is confirmed by sending an ARP message. The error will rectify itself in subsequent transmissions.

A fourth possibility is that the DLLD address in the packet is all-adjacent-BLIPs, but there is no ARP database entry for the IP destination address. An ARP message is issued to update the database, as in block 78. The packet may be temporarily stored until the ARP reply is received, or may be discarded. Subsequent retransmission of the packet will be received after the ARP database has been updated.

A final possibility is that the DLLD address is equal to the corresponding entry in the ARP database, but both are incorrect. Obviously, there is no way to detect this error, but its possible effects are minimized by periodically refreshing the ARP database, as indicated in block 80.

Figure 3:
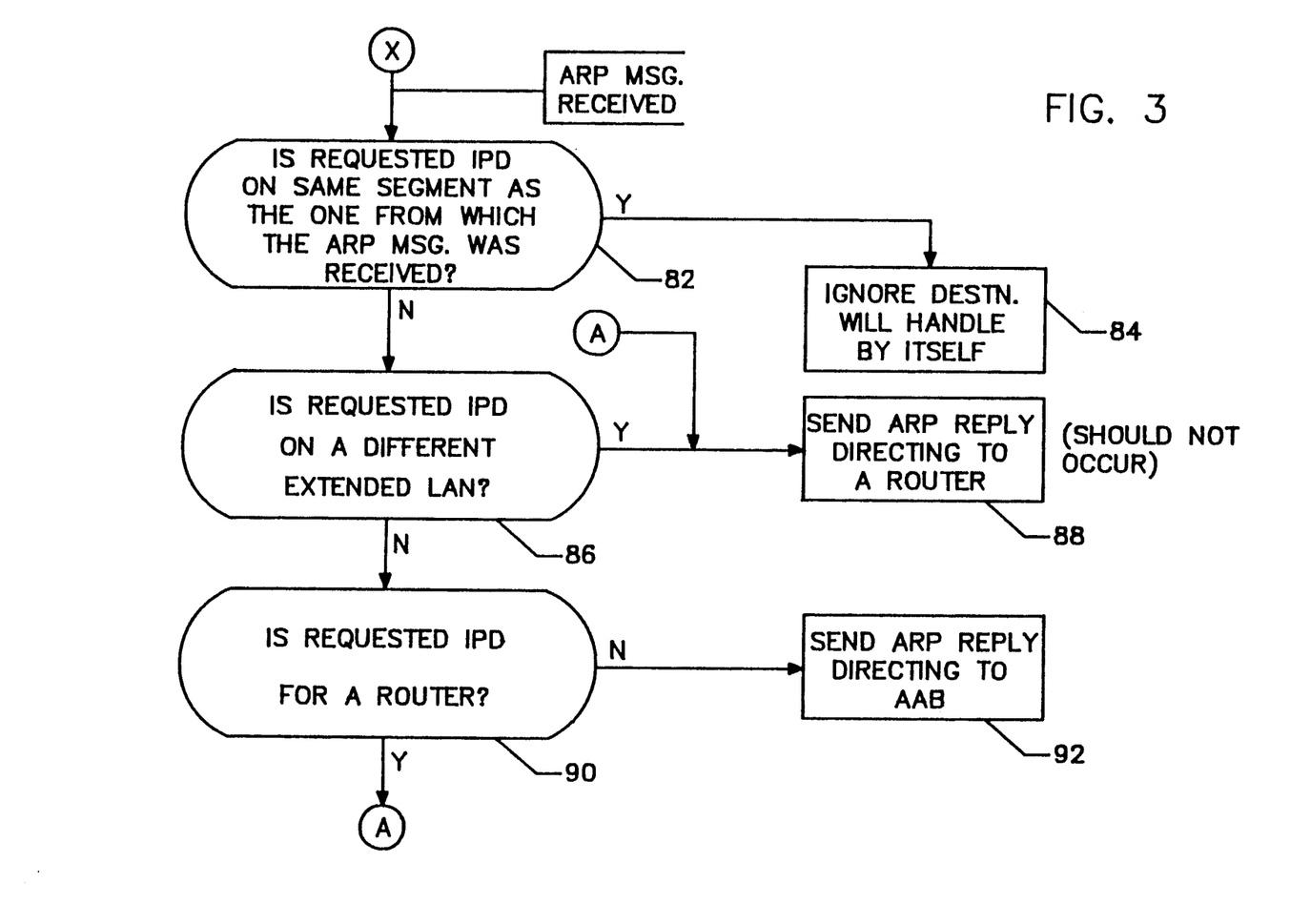
FIG. 3 is a flowchart showing the functions performed by a BLIP upon receipt of an ARP message.

More details of ARP message processing by a BLIP are shown in FIG. 3. When an ARP message is received, it is first determined, in block 82, whether the message came from the same segment as the one on which the IP destination is located. If so, the ARP message is ignored, as indicated in block 84, since the generation of a reply will presumably be handled by the destination host.

If it is determined in block 82 that the requested IP destination is not on the same segment as the one that the ARP message was received from, it is next determined, in block 86, whether the requested IP destination is on a different LAN or extended LAN from the one in which the BLIP is located. If so, which should not be the case, an ARP reply will be sent to direct packet transmission to a router, as indicated in block 88. Finally, it is determined in block 90 whether the requested IP destination is that of an IP router. If so, an ARP reply will be sent to direct packet transmission to a router, as shown in block 88. If not, an ARP reply is generated, as shown in block 92, indicating that the DLLD address is all-adjacent-BLIPs.

Figure 4:
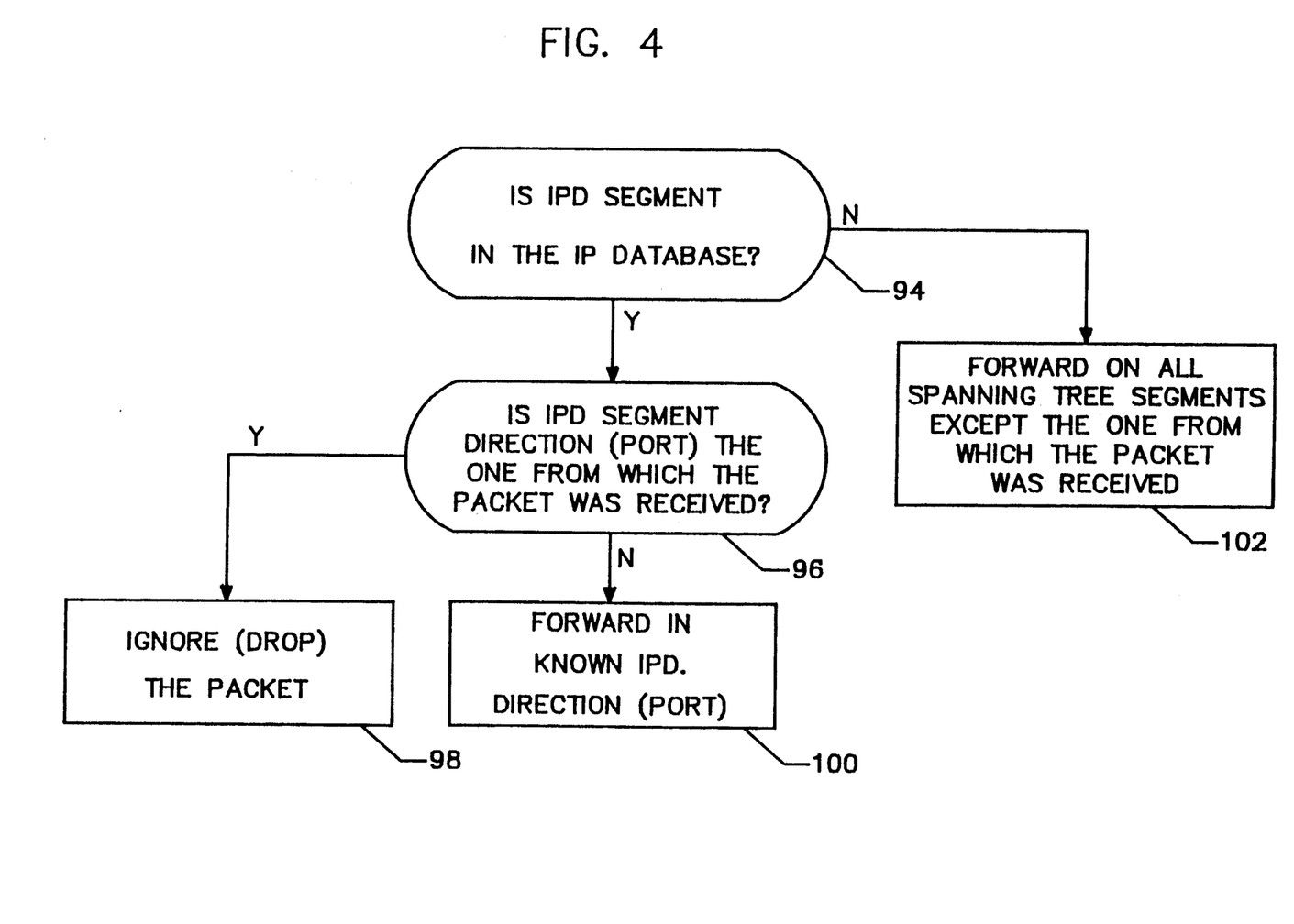
FIG. 4 is a flowchart showing in more detail the functions performed by the BLIP in forwarding an IP data packet.

FIG. 4 shows in more detail how a packet is forwarded through the spanning tree (block 60). First, the IP destination subnet address is examined, in block 94, to determine if it is in the IP database, i.e. to determine whether its directional location is already known. If so, another question is posed, in block 96, to determine if the IP destination subnet directional location is the same as the direction from which the packet was received. If so, there is no point in forwarding the packet in the same direction as the one from which it was received, and the packet is ignored, as shown in block 98. If the subnet directional location is not the same as the directional location from which the packet was received, the packet is forwarded in the direction determined from the IP database, as indicated in block 100. If the IP destination subnet address is not in the IP database, as determined in block 94, the packet is forwarded over all spanning tree segments except the one over which it was received, as indicated in block 102.

There are a number of possible situations that can serve as examples of the manner in which the BLIPs operate, depending on the locations of the source and destination hosts. These will now be described, with occasional reference to the BLIP functions shown in the drawings.

A. Source and destination both within the same extended LAN segment. The source will issue an ARP message to obtain the correct data link layer destination address, and will obtain that address from the destination itself. The BLIPs will play no direct part in this operation. On receiving the ARP message, a BLIP will determine that the message is from the same segment as the destination (block 82), and will ignore the message (block 84). On receiving the data packet, a BLIP will determine that the packet is from the same attached segment as the destination (block 64), and will ignore the packet if its data link layer destination address matches the one in the BLIPs ARP database corresponding to the IP destination address (block 72). However, each BLIP receiving the transmitted packet will perform additional functions if the data link layer destination address does not match the BLIP's ARP database. More specifically:

1) If the data link layer destination address in the packet is the special all-adjacent-BLIPs address, the BLIP will obtain its ARP database entry and forward the packet there, also sending a "redirect" message back to the source (block 74). If the BLIP has no ARP database entry corresponding to the IP destination address in the packet, it will attempt to obtain an entry by sending an ARP message (block 78).

2) If the BLIP has a correct ARP database entry, but the source host chose to send the packet to an incorrect data link layer address, then the BLIP will overwrite the data link layer destination address, and will send a "redirect" message to the source (block 76). For example, the source might incorrectly choose to send a packet to an IP router, which is only optimal for destinations outside the extended LAN.

3) If the BLIP has an incorrect entry in its ARP database, but the packet has a correct data link layer destination address, unfortunately the procedure in paragraph 2) above will result in the packet's being forwarded to an incorrect destination. However, the BLIP will also refresh its database by issuing an ARP message, and on the next packet transmission from the source the BLIP will correctly forward the packet.

4) If the BLIP has an incorrect database entry, but the source host agrees with that incorrect entry, perhaps because the BLIP sent a "redirect" message with the incorrect destination, this situation is the same as one encountered in conventional IP routers, and referred to as the ARP cache invalidation problem. The problem is minimized in the BLIPs by periodic refreshing of ARP database entries (block 80); e.g. every ten minutes.

B. Source and destination located on different segments of the same extended LAN. The source host will not be able to distinguish the destination from one in its own extended LAN segment, since each host is unaware of the division of the extended LAN into segments. The source host will issue an ARP message and will receive an ARP reply from adjacent BLIPs (block 92), indicating the data link layer destination address as all-adjacent-BLIPs. Data packets directed to this address will be correctly forwarded by the BLIPs (blocks 66, 68).

C. Source within the extended LAN, destination outside the extended LAN. A source host wishing to communicate with a destination outside the extended LAN is aware that it must use an IP router for this purpose. The source host chooses a router at random and the BLIPs will forward the packet toward the chosen router. Subsequently, the addressed router might send a "redirect" message back to the source, if a more optimum router should be used. When the source host receives the "redirect," it will issue an ARP to get the data link layer address of the optimum router. The BLIP will reply with the correct station address of the router, obtained from its manually configured database of router addresses. The router itself does not receive the ARP request. In this way the BLIP keeps the ARP requests and replies local to a part LAN segment and thereby minimizes "storms" of ARP requests and replies.

D. Source outside the extended LAN, destination within the extended LAN. Once the packet is received by an IP router connected to the extended LAN, the router will send an ARP message to determine the data link layer address of the destination. If the destination is on the same extended LAN segment as the router, the destination will itself respond to the ARP message, and the router will forward the packet to the destination. If the destination is on a different extended LAN segment from the router, all BLIPs connected to the same segment as the router will respond to the ARP message with the special all-adjacent-BLIPs address (block 92). The router will then forward the packet into the extended LAN, as desired, with a data link layer destination address of all-adjacent-BLIPs. The BLIPs will then process the packet in accordance with FIG. 2, forwarding it through the spanning tree (block 60) until the destination segment is reached, and then forwarding the packet to its ultimate destination within the segment (blocks 66, 68).

It will be appreciated from the foregoing that the present invention represents a significant advance in the field of local area networks that handle TCP/IP traffic. In particular, the invention permits TCP/IP traffic to be forwarded through an interconnected extended LAN without the use of IP routers, and without the disadvantages of bridges used for the same purpose. Each BLIP functions as a bridge for non-TCP/IP traffic and functions analogously to a bridge for TCP/IP traffic, using addresses at the IP or network layer level. It will also be appreciated that, although an embodiment of the invention has been described in detail for purposes of illustration, various modifications may be made without departing from the spirit and scope of the invention. Accordingly, the invention is not to be limited except as by the appended claims.

We claim:

1. For use in a configuration of interconnected local area networks (LANs) handling message traffic in accordance with a set of inter-network protocols that use a network addressing scheme, a bridge-like IP router (BLIP), comprising:
   multiple ports for attaching the BLIP to multiple segments of an extended LAN;
   means for distinguishing received message traffic that uses the inter-network protocols from other message traffic that does not use the protocols;
   bridge means for processing the other message traffic exactly in the manner of a conventional bridge, using unique station addresses to determine how to forward the received message traffic; and
   bridge-like means for processing the inter-network protocol traffic in a manner analogous to a bridge, wherein a message packet received from an extended LAN segment attached to the BLIP is forwarded if necessary to at least one other extended LAN segment attached to the BLIP, using network addresses and network segment addresses, instead of unique station addresses, to determine how to forward the message traffic.

2. A bridge-like IP router as defined in claim 1, and further comprising:
   means for processing address resolution messages requesting destination address information.

3. A bridge-like IP router as defined in claim 2, wherein:
   the means for processing address resolution messages includes means for detecting and discarding address resolution messages requesting destination address information, and means for responding to the address resolution messages by transmitting in reply a message packet containing a special address code, but only if the request destination address is on a different segment of the same extended LAN as the BLIP; and
   the bridge-like means includes means for forwarding any received message packet containing the special address code, to some subset of the attached extended LAN segments except the one from which the message packet was received;
   whereby a host device may transmit to destinations on other extended LAN segments as though the destinations were on the same LAN.

4. For use in a configuration of interconnected local area networks (LANs) handling message traffic in accordance with a set of protocols known as TCP/IP, a bridge-like IP router (BLIP), comprising:
   multiple ports for attaching the BLIP to multiple segments of an extended LAN;
   means for distinguishing received TCP/IP message traffic from non-TCP/IP message traffic;
   bridge means for processing non-TCP/IP message traffic exactly in the manner of a conventional bridge; and
   bridge-like means for processing TCP/IP traffic in a manner analogous to a bridge, wherein a message packet received from an extended LAN segment attached to the BLIP is forwarded if necessary to some subset of the attached extended LAN segments except the one from which the message packet was received at least one other extended LAN segment attached to the BLIP.

5. A bridge-like IP router as defined in claim 4, and further comprising:
   means for processing address resolution messages requesting destination address information.

6. A bridge-like IP router as defined in claim 5, wherein:
   the means for processing address resolution messages includes means for detecting and discarding address resolution messages requesting destination address information, and means for responding to the address resolution messages by transmitting in reply a message packet containing a special address code, but only if the requested destination address is on a different segment of the same extended LAN as the BLIP; and the bridge-like means includes means for forwarding any received message packet containing the special address code, to some subset of the attached extended LAN segments except the one from which the message packet was received;

whereby a host device may transmit to destinations on other extended LAN segments as though the destinations were on the same LAN.

7. A bridge-like IP router as defined in claim 4, wherein the bridge-like means includes:

an IP database associating each segment of the extended LAN with a port of the BLIP; and means for updating the IP database by observing each received message and correlating the segment address for each message source with a port through which the message is received.

8. A bridge-like IP router as defined in claim 4, wherein the bridge-like means includes:

an ARP database associating each network layer address in attached extended LAN segments with a corresponding data link layer address; and means for updating the ARP database by sending ARP messages directed to specific network layer addresses and processing ARP replies that contain the corresponding data link layer addresses.

9. A bridge-like IP router as defined in claim 4, wherein the bridge-like means includes:

a router database containing data link layer addresses for all true IP routers connected to the extended LAN.

10. For use in a configuration of interconnected local area networks (LANs) handling message traffic in accordance with a set of protocols known as TCP/IP, a bridge-like IP router (BLIP), comprising:

multiple ports for attaching the BLIP to multiple segments of an extended LAN;

means for distinguishing received TCP/IP message traffic from non-TCP/IP message traffic;

bridge means for processing non-TCP/IP message traffic exactly in the manner of a conventional bridge; and bridge-like means for processing TCP/IP traffic in a manner analogous to a bridge, wherein a message packet received from an extended LAN segment attached to the BLIP is forwarded if necessary to at least one other extended LAN segment attached to the BLIP;

wherein the bridge-like means includes means for detecting and discarding ARP messages requesting destination address information, means for responding to ARP messages by transmitting in reply a message packet containing a special address code, but only if the requested destination address is on a different segment of the same extended LAN as the BLIP, means for forwarding any received message packet containing the special address code, to at least one other attached extended LAN segment, whereby a host device may transmit to destinations on other extended LAN segments as though the destinations were on the same LAN, an IP database associating each segment of the extended LAN with a port of the BLIP, means for updating the IP database by observing each received message and correlating the segment address for each message source with a port through which the message is received, an ARP database associating each network layer address in attached extended LAN segments with a corresponding data link layer address, and means for updating the ARP database by sending ARP messages directed to specific network layer addresses and processing ARP replies that contain the corresponding data link layer addresses.

11. A bridge-like IP router as defined in claim 10, wherein the bridge-like means further includes:

a router database containing data link layer addresses for all true IP routers connected to the extended LAN.

12. A bridge-like IP router as defined in claim 11, wherein the bridge-like means further includes:

means for determining whether a received message packet is destined for an attached segment of the extended LAN;

means for forwarding a packet destined for an attached segment other than the one from which the packet was transmitted, by obtaining a data link layer destination address from the ARP database;

means for forwarding a packet destined for a segment unattached to the BLIP, by transmitting the packet to at least one other segment through a port selected to reach the destination segment.

13. A bridge-like IP router as defined in claim 12, wherein the bridge-like means further includes:

address checking means effective for processing a packet destined for the same extended LAN segment as the one from which the packet was received by the BLIP, for taking corrective action depending on the data link layer destination address contained in the packet.

14. A bridge-like IP router as defined in claim 13, wherein the address checking means includes:

means for discarding the packet if the data link layer destination address matches an entry in the ARP database corresponding to an IP destination address contained in the packet;

means for substituting the ARP database entry for a data link layer destination address in the packet if there is no match; and means for sending a redirect message to a source host from which the packet was transmitted, if there is no match, and sending an ARP message to verify the correctness of database entry.

15. A method of operation of a configuration of interconnected local area networks (LANs) handling message traffic in accordance with a set of protocols known as TCP/IP, the method comprising the steps of:

configuring an extended local area network (LAN) to include a plurality of extended LAN segments connected by bridge-like IP routers (BLIPs);

receiving a packet of data at a BLIP;

determining whether the packet has been transmitted under TCP/IP protocols;

processing non-TCP/IP packets in the manner of a conventional bridge; and processing TCP/IP traffic in a manner analogous to a bridge, wherein a message packet received from an extended LAN segment attached to the BLIP is forwarded if necessary to at least one other extended LAN segment attached to the BLIP.

16. A method as defined in claim 15, and further comprising:

detecting and discarding ARP messages requesting destination address information;

responding to ARP messages by transmitting a message packet containing a special address code, but only if the requested destination address is on a different segment of the same extended LAN as the BLIP; and forwarding any received message packet containing the special address code, to at least one other attached LAN segment;

whereby a host device may transmit to destinations on other extended LAN segments as though the destinations were on the same LAN.

17. A method as defined in claim 15, and further comprising:

maintaining an IP database that associates each segment of the extended LAN with a port of the BLIP;

wherein the maintaining step is performed by observing each received message and correlating the segment address for each message source with a port through which the message is received.

18. A method as defined in claim 15, and further comprising:

maintaining an ARP database that associates each network layer address in attached extended LAN segments with a corresponding data link layer address;

wherein the maintaining step is performed by sending ARP messages directed to specific network layer addresses and processing ARP replies that contain the corresponding data link layer addresses.

19. A method as defined in claim 15, and further comprising:

maintaining a router database containing the data link layer addresses of all true IP routers connected to the extended LAN.

20. A method of operation of a configuration of interconnected local area networks (LANs) handling message traffic in accordance with a set of protocols known as TCP/IP, the method comprising the steps of:

configuring an extended local area network (LAN) to include a plurality of extended LAN segments connected by bridge-like IP routers (BLIPs);

receiving a packet of data at a BLIP;

determining whether the packet has been transmitted under TCP/IP protocols;

processing non-TCP/IP packets in the manner of a conventional bridge;

processing TCP/IP traffic in a manner analogous to a bridge, wherein a message packet received from an extended LAN segment attached to the BLIP is forwarded if necessary to at least one other extended LAN segment attached to the BLIP;

detecting and discarding ARP messages requesting destination address information;

responding to ARP messages with a special address code when the requested destination address is on a different segment of the same extended LAN as the BLIP;

forwarding a message packet having the special address code, to at least one other attached LAN segment, whereby a host device may transmit to destinations on other extended LAN segments as though the destinations were on the same LAN;

maintaining an IP database that associates each segment of the extended LAN with a port of the BLIP, wherein the maintaining step is performed by observing each received message and correlating the segment address for each message source with a port through which the message is received;

maintaining an ARP database that associates each network layer address in attached extended LAN segments with a corresponding data link layer address, wherein the maintaining step is performed by sending ARP messages directed to specific network layer addresses and processing ARP replies that contain the corresponding data link layer addresses; and maintaining a router database containing the data link layer addresses of all true IP routers connected to the extended LAN.

21. A method as defined in claim 20, and further comprising:

determining whether a received message packet is destined for an attached segment of the extended LAN;

forwarding a packet destined for an attached segment other than the one from which the packet was transmitted, by obtaining a data link layer destination address from the ARP database; and forwarding a packet destined for a segment unattached to the BLIP, by transmitting the packet to at least one other segment through a port selected to reach the destination segment.

22. A method as defined in claim 21, and further comprising:

checking the destination address of every packet destined for the same extended LAN segment as the one from which the packet was transmitted; and taking corrective action depending on the data link layer destination address contained in the packet.

23. A method as defined in claim 22, wherein the step of taking corrective action includes:

discarding the packet if the data link layer destination address matches an entry in the ARP database corresponding to an IP destination address contained in the packet.

24. A method as defined in claim 22, wherein the step of taking corrective action includes, if there is no match between the data link layer destination address in the packet and an entry in the ARP database corresponding to an IP destination address contained in the packet:

substituting the ARP database entry for the data link layer destination address in the packet; and sending a redirect message to a source host from which the packet was transmitted.

25. A method of operation of a configuration of interconnected local area networks (LANs) handling message traffic in accordance with a set of inter-network protocols that use a network addressing scheme, the method comprising the steps of:

configuring an extended local area network (LAN) to include a plurality of extended LAN segments connected by bridge-like IP routers (BLIPs);

receiving a packet of data at a BLIP;

determining whether the packet has been transmitted under the inter-network protocols;

processing packets that were not transmitted under the inter-network protocols in the manner of a conventional ridge, using unique station addresses to determine how to forward the received packets; and processing inter-network protocol traffic in a manner analogous to a bridge, wherein a message packet received from an extended LAN segment attached to the BLIP is forwarded if necessary to at least one other extended LAN segment attached to the BLIP, using network addresses and network segment addresses, instead of unique station addresses, to determine how to forward the packets.

26. A method as defined in claim 25, and further comprising:

detecting and discarding address resolution messages requesting destination address information;

responding to the address resolution messages by transmitting a message packet having a special address code, but only if the requested destination address is on a different segment of the same extended LAN as the BLIP; and forwarding any received message packet containing the special address code, to at least one other attached LAN segment;

whereby a host device may transmit to destinations on other extended LAN segments as though the destinations were on the same LAN.

* * * * *